United States Patent
Pasanen et al.

(10) Patent No.: US 7,460,862 B2
(45) Date of Patent: Dec. 2, 2008

(54) SOLUTION FOR MANAGING USER EQUIPMENT VERSION INFORMATION IN A MOBILE COMMUNICATIONS NETWORK

(75) Inventors: Juha Pasanen, Espoo (FI); Pekka Anttalainen, Helsinki (FI)

(73) Assignee: Nokia Corporation, Espoo (FI)

( * ) Notice: Subject to any disclaimer, the term of this patent is extended or adjusted under 35 U.S.C. 154(b) by 485 days.

(21) Appl. No.: 10/462,820

(22) Filed: Jun. 17, 2003

(65) Prior Publication Data

US 2004/0147242 A1 Jul. 29, 2004

Related U.S. Application Data

(60) Provisional application No. 60/443,198, filed on Jan. 29, 2003.

(51) Int. Cl.
*H04Q 7/20* (2006.01)
(52) U.S. Cl. ................. 455/418; 455/419
(58) Field of Classification Search ............ 455/418, 455/419, 403, 414.1; 370/465
See application file for complete search history.

(56) References Cited

U.S. PATENT DOCUMENTS

| | | | | |
|---|---|---|---|---|
| 5,848,064 A * | 12/1998 | Cowan | ............... | 370/338 |
| 6,031,830 A * | 2/2000 | Cowan | ............... | 370/338 |
| 6,119,000 A * | 9/2000 | Stephenson et al. | ...... | 455/432.1 |
| 6,308,217 B1 * | 10/2001 | Sasagawa | ............... | 709/236 |
| 6,421,346 B1 * | 7/2002 | Itoh et al. | ............... | 370/395.7 |
| 6,567,667 B1 * | 5/2003 | Gupta et al. | ............... | 455/445 |
| 6,678,741 B1 * | 1/2004 | Northcutt et al. | ............. | 709/248 |
| 6,711,402 B1 * | 3/2004 | Chelliah et al. | ............. | 455/415 |
| 6,836,473 B1 * | 12/2004 | Eriksson | ................. | 370/337 |
| 2002/0001296 A1 * | 1/2002 | Lee et al. | ................ | 370/338 |
| 2002/0066011 A1 | 5/2002 | Vialen et al. | | |
| 2002/0071480 A1 * | 6/2002 | Marjelund et al. | ......... | 375/141 |
| 2002/0172220 A1 * | 11/2002 | Baker et al. | ............... | 370/465 |
| 2003/0143991 A1 * | 7/2003 | Minear et al. | ............. | 455/419 |
| 2004/0106430 A1 * | 6/2004 | Schwarz et al. | ......... | 455/552.1 |

FOREIGN PATENT DOCUMENTS

WO    WO 0054536    *    9/2000
WO    WO 02/067617 A1    8/2002

OTHER PUBLICATIONS

3rd Generation Partnership Project (3GPP) Technical Specification Group (TSG)—RAN Meeting #16 Tdoc S2-021503 Macro Island, FL, USA, Jun. 4-7, 2002 RP-020274 Tdoc S2-021503.*

* cited by examiner

*Primary Examiner*—William J Deane
(74) *Attorney, Agent, or Firm*—Squire, Sanders & Dempsey L.L.P.

(57) ABSTRACT

A method for managing user equipment version information in a mobile communications network is provided. A mobile communications network, a network element of core network, and a user equipment implement the method. The mobile communications network comprises a plurality of user equipment, a plurality of network elements, and one or more user equipment version corresponding to a user equipment functionality set that corresponds to a group of user equipment. At least one user equipment is configured to spontaneously integrate an identifier that indicates its user equipment version within a defined signaling message transmitted from the user equipment to a network element, and at least one network element is configured to receive the signaling message and to extract the identifier that indicates the user equipment version from the signaling message.

20 Claims, 2 Drawing Sheets

SOLUTION FOR MANAGING USER EQUIPMENT VERSION INFORMATION IN A MOBILE COMMUNICATIONS NETWORK

CROSS-REFERENCE TO RELATED APPLICATIONS

This application claims priority of U.S. Provisional Application Ser. No. 60/443,198 entitled, "Solution for Managing User Equipment Version Information in a Mobile Communications Network," filed Jan. 29, 2003, the entire contents of which are incorporated herein by reference.

BACKGROUND OF THE INVENTION

1. Field of the Invention

The present invention relates to mobile communications networks, and more particularly to a method for managing user equipment version information in a mobile communications network, and a mobile communications network, a network element, and user equipment implementing said method.

2. Description of the Related Art

A mobile communications system refers generally to any telecommunications system wherein the access point (typically wireless access) to the system may change when users are moving within the service area of the system. A typical mobile communications system is a Public Land Mobile Network (PLMN). The mobile communications network is often an access network providing a user with a wireless access to external networks, hosts, or services offered by specific service providers.

Mobile communication systems are developed continuously and one of the main objectives is to provide a possibility to use IP services through the mobile system. Correspondingly, an IP technology is being developed to cover the conventional services of mobile systems, such as telephony. These two technologies have been combined in a 3GPP AII-IP system. The UMTS (Universal Mobile Telecommunication System) is an example of a system based on the IP technology defined in the co-operation project of what are known as a third-generation mobile systems, 3GPP (3rd Generation Partnership Project). The 3GPP AII-IP system is a biplane system comprising an application layer providing services and a transport layer providing data transfer. At least in the beginning the GSM system (Global System for Mobile Communications) and especially the services of what is known as the GSM 2+phase, such as the GPRS (General Packet Radio Service), are utilized in the transport layer.

FIG. 1 shows a simplified UMTS architecture illustrating only the parts essential to the invention, although it is apparent to a person skilled in the art that a common mobile telephone system also comprises other well-known functions and structures, which need not be discussed in greater detail here. The main parts of the UMTS are: a core network (CN) 150, a UMTS terrestrial radio access network (UTRAN) 100, and a user equipment (UE) 170. The interface between the core network 150 and the UMTS terrestrial radio access network 100 is called the Iu interface, and the air interface between the UMTS terrestrial radio access network 100 and the user equipment 170 is called the Uu interface.

The UMTS terrestrial radio access network 100 consists of a set of radio network subsystems 110, 111 (also called radio access networks) connected to the core network 150 over the Iu-interface. Each RNS is responsible for the resources of its cells. A radio network subsystem (RNS) consists of a radio network controller (RNC), and a multiplicity of nodes B, logically corresponding to base stations of traditional cellular systems. The interface between two radio network subsystems RNSs is called the Iur interface. The interface between the radio network controllers and the nodes B is called the Iub interface.

The radio network controllers 111, 121 are the network nodes responsible for the control of the radio resources of the UMTS terrestrial radio access network 100. A radio network controller 111 interfaces the core network 150 and also terminates the RRC protocol (Radio Resource Control) that defines the messages and procedures between the mobile and the UMTS terrestrial radio access network 100. It logically corresponds to a base station controller in the GSM systems. On connections between the user equipment 170 and the UMTS terrestrial radio access network 100, one radio network controller 111 is a serving radio network controller. As shown in FIG. 1, radio network controller 111 is connected to two core network 150 nodes, a Mobile Services Switching Centre/Visitor Location Register (MSC/VLR) 151 and a Serving GPRS (General Packet Radio Service) Support Node (SGSN) 152. In some network topologies it is also possible that one radio network controller 111 is connected to one or more than two core network 150 nodes which may be of similar or different type. For example, a radio network controller 111 can basically be connected to several SGSNs.

The main function of node B 112 is to perform air interface layer 1 processing (channel coding and interleaving, rate adaptation, spreading, etc). It also performs some basic Radio Resource Management operations, such as the inner loop power control.

The core network 150 may be connected to external networks, which can either be Circuit Switched (CS) networks (e.g. PLMN, PSTN, ISDN) or Packet Switched (PS) networks (e.g. the Internet). The core network 150 typically comprises a Home Location Register (HLR), MSC/VLR, a Gateway MSC GMSC, a SGSN and a Gateway GPRS Support Node (GGSN). The core network 150 described herein is based on a second generation GSM/GPRS network. Other types of core networks 150, for example IS-41, typically comprise other network elements.

The user equipment 170 can be a simplified terminal for speech only or it can be a terminal for diverse services acting as a service platform and supporting the loading and execution of various functions related to the services. The user equipment 170 comprises actual mobile equipment (ME) 171 and a detachably connected identification card such as a User Service Identity Module (USIM) 172, also called a subscriber identity module. In this context, the user equipment generally refers to the entity formed by the subscriber identity module and the actual mobile equipment. The USIM is a smart card that substantially holds the subscriber identity, performs authentication algorithms, and stores authentication and encryption keys and other subscription information that is needed at the mobile station. The mobile equipment is a radio terminal used for radio communication over the Uu interface between the user equipment 170 and the UMTS terrestrial radio access network 100. The mobile equipment may be any equipment capable of communicating in a mobile communication system or a combination of several pieces of equipment, for instance a multimedia computer to which a card phone has been connected to provide a mobile connection.

When launching new systems, it can be anticipated that at least during the early phases some kind of inconsistency will appear between the functionality of different types of user equipment 170. However, due to the vast number of UMTS features, it is not possible to test all possible terminal and network feature combinations before releasing new products or product versions into use. Thus, even if the user equipment 170 is tested and type approved, problems may arise either directly or through some unwanted side effects in activation of at least some new network features.

In order to overcome this it has been agreed upon in connection with the standardization work that the specification will allow sending an information element from the core network 150 to the radio network controller to indicate the specific behavior related to the user equipment 170. This will allow the radio network controller to adopt an appropriate corrective action by adjusting the operation towards the specific user equipment, either proactively or as soon as a problem is identified.

In order to be able to map the appropriate corrective actions to the specific user equipment group, 3GPP has specified an information element Software Version number (IMEISV). Naturally any other indicator capable of associating the user equipment 170 to a defined functionality type is possible. Thus in this context the term user equipment version should be interpreted to refer to a user equipment functionality set that is essentially similar for a user equipment group, wherein the user equipment specific behavior to be applied from the network side can be determined based on the user equipment version of the user equipment. The specified IMEISV comprises elements as shown in FIG. 2:

Type Allocation Code (TAC) 20, 8 digits. The Type Allocation Code (TAC) is issued by a central body.

Serial Number (SNR) 21 6 digits. SNR is an individual serial number that uniquely identifies each equipment within each TAC. Manufacturers shall allocate individual serial numbers (SNR) in a sequential order.

Software Version Number (SVN) 22, 2 digits. SVN identifies the software version number of the mobile equipment. The Software Version Number is allocated by the manufacturer.

According to the current specifications (ETSI 3GPP TS 24.008 V5.6.0 (2002-12), Technical Specification, 3rd Generation Partnership Project, Technical Specification Group Core Network, Mobile radio interface Layer 3 specification, Core network protocols; Stage 3, Release 5, later referred to as 3GPP 24.008), the core network 150 has two ways to receive the IMEISV of the user equipment 170. The core network 150 may request it separately through an Identity Request procedure, or request it within the Authentication and Ciphering procedure, as specified in 3GPP 24.008.

However, a separate signaling message sequence for delivering the information on the user equipment version causes unnecessary delay to the procedures and load to the system. In poor radio conditions the effect will even increase due to retransmissions. Furthermore, added signaling potentially increases the call fail risk, and the connection setup times are likely to grow.

As an example of the related problem let us consider emergency call handling. When an emergency call is initiated with the user equipment 170 without the USIM 172, or the user equipment 170 is provided with USIM 172, but is not attached, the appropriate information on the user equipment version is not appropriately available to the network. In such a case the core network 150, essentially the MSC 151, should automatically assume that the mobile is at the most basic functionality level, and signal this to the UMTS terrestrial radio access network 100, essentially the radio network controller 111. Since the user equipment is likely to be of some other functionality level, in order for the radio network controller to be able to apply the correct specific behavior related to the user equipment, the MSC actually needs to request the full IMEISV from the user equipment as described in 3GPP 24.008. This creates an considerable amount of additional signaling and typically increases the delay of the critical processes.

In another example, when a USIM 172 is removed from a first mobile in a location area of the first MSC, and re-inserted into a second mobile that is powered up in a location area of a second MSC, the mobile performs a circuit switched location update where the IMEISV is not exchanged. The new MSC can retrieve the IMEISV from the old MSC through a defined signaling procedure, but in this case the retrieved information will relate to the first mobile and therefore be incorrect. For the network to be able to apply the correct specific behavior associated with that the user equipment 170, again a separate signaling sequence and the related delays are necessary for requesting the full IMEISV from the user equipment.

SUMMARY OF THE INVENTION

According to one embodiment, the invention optimizes the signaling associated with indicating the user equipment version from the user equipment 170 to the core network 150 by arranging the user equipment 170 to spontaneously integrate said information to a non-access stratum (NAS) signaling message of another information. In this context, spontaneous integration refers to user equipment action that is not requested by the network. In a preferred embodiment of the invention information is delivered in an early NAS message, for example associated with the establishment of a signaling connection from the user equipment to the core network 150. In another embodiment of the invention, information on the functionality level of the user equipment 170 is delivered in connection with other identity related information, for example subscriber information (International Mobile Subscriber Identity, IMSI) or equipment information (International Mobile station Equipment Identity, IMEI), transmitted in response to an identity request from the core network 150.

One advantage of the invention is to facilitate early delivery of the necessary information with an optimized signaling load. It is thereby possible to optimally implement an action for which essentially a temporal requirement is anticipated. This facilitates implementing the correct specific behavior related to the user equipment 170 in the radio access network right from the start of the implementations. Hereby the critical period in the beginning of the network operations can be overcome, however, without causing an unnecessary permanent load to the system. At the same time, controlling of the spontaneous sending of the information is facilitated for the user equipment 170, whereby the signaling load related to the anticipated inconsistencies between the particular equipment product and the network where it will be primarily used, can be adjusted, essentially from the viewpoint of the terminal, e.g. based on the functionality level of the terminal or the network.

BRIEF DESCRIPTION OF THE DRAWINGS

In the following the invention will be described in greater detail by means of the preferred embodiments with reference to the attached drawings, in which.

DETAILED DESCRIPTION OF THE PREFERRED EMBODIMENTS

Figure 1:
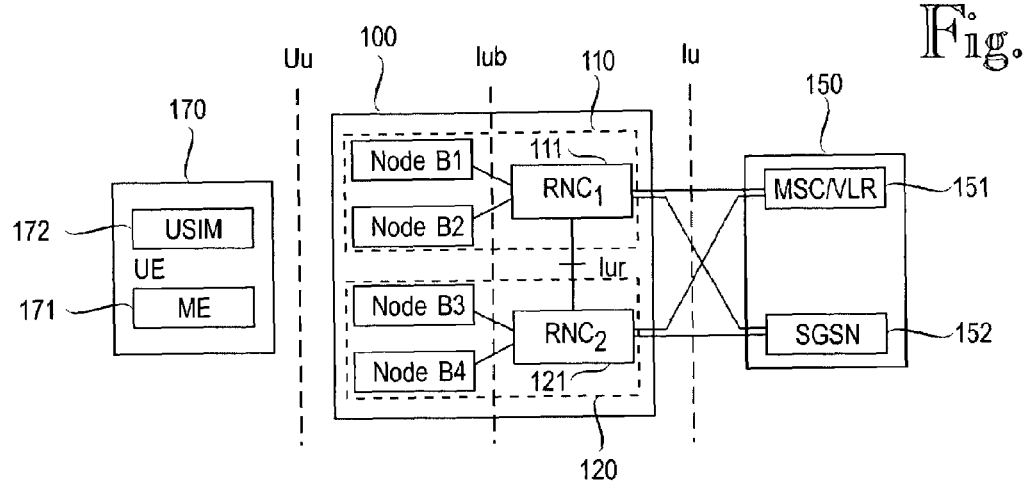
FIG. 1 shows a simplified UMTS architecture.
Figure 2:
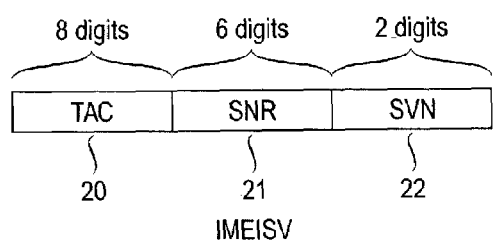
FIG. 2 shows the elements of an IMEISV.

The preferred embodiments of the invention are described in the following as implemented in the third generation mobile system UMTS as illustrated in FIG. 1. However, the aim is not to restrict the invention to these embodiments. The invention is applicable to be used in any telecommunications system in which user equipment specific behavior can be applied to the user equipment by the network. Other examples of such systems are the IMT-2000, the IS-41, the GSM (Global System for Mobile communications), or corresponding mobile systems, such as the PCS (Personal Communication System) or the DCS 1800 (Digital Cellular System for 1800 MHz). The specifications of the mobile communication systems in general and of the IMT-2000 and the UMTS systems in particular evolve rapidly. This evolution may involve new means to apply the invention. Therefore, all terms and expressions should be interpreted as widely as possible, as they are intended to describe not to limit the invention. What is essential for the invention is the function and not the network element or apparatus in which it is executed.

Figure 3:
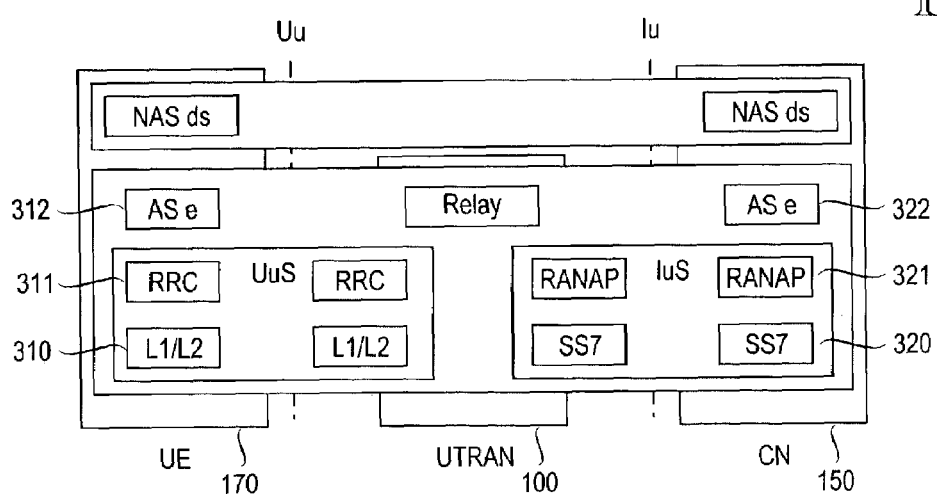
FIG. 3 shows the overall UMTS protocol architecture.

FIG. 3 shows the overall UMTS protocol architecture in a system according to FIG. 1, illustrated in terms of its entities user equipment 170, UMTS terrestrial radio access network 100 and the core network 150, and the respective reference points Uu (Radio Interface) and Iu (CN-UTRAN interface). In order not to obscure the present invention, well known features are omitted from or simplified in the description. FIG. 3 illustrates furthermore the high-level functional grouping into an Access Stratum (AS) and a Non-Access Stratum (NAS), wherein the AS offers services to the NAS through a number of Service Access Points (not shown). The protocol structures of UMTS terrestrial radio access network 100 terrestrial interfaces are designed according to a generic protocol model, wherein the layers and planes are logically independent of each other. This means that, if necessary, parts of the protocol structure may at a later stage be changed while other parts remain intact. The model in FIG. 3 distinguishes the end AS entities, which provide the services to higher layers, from the local entities, which provide services over the Uu and the Iu reference points respectively. The Uu Stratum (UuS) block includes a radio interface protocol stack.

The radio protocols (RP) in the radio interface Uu essentially comprise three protocol layers: a physical layer L1 310 and a data link layer L2 310, and a network layer L3. The network layer L3 is divided into Control (C-) and User (U-) planes. In the C-plane, the L3 is partitioned into sublayers where the lowest sublayer, denoted as Radio Resource Control (RRC) 311, interfaces with the L2 and terminates in the UMTS terrestrial radio access network 100. The next sublayer ASe 312 provides a 'Duplication avoidance' functionality, which terminates in the core network 150 but is part of the AS; it provides the AS Services to higher layers. There are primarily two kinds of signaling messages transported over the radio interface—RRC-generated signaling messages and NAS messages generated in the higher layers. The RRC layer provides the UE-UTRAN portion of the signaling connections to the upper layers to support the exchange of information flow in the upper layer.

As indicated in FIG. 1, the Iu is an open interface that divides the system into a radio-specific UMTS terrestrial radio access network 100 and the core network 150 that handles switching, routing and service control. The original purpose of standardization was to develop one Iu interface, but in order to optimize the User Plane transport for both circuit switched (CS) and packet switched (PS) services, the Transport Network has been specified differently for both cases. The control plane of Iu stratum IuS is used for all UMTS specific signaling, and it comprises an application protocol RAN application part (RANAP) 321, on top of Broad Band SS7 protocols 320. The RANAP is the signaling protocol of the Iu that comprises the control information specified for the Iu radio network layer. The functionality of the RANAP is implemented with various RANAP elementary procedures, that comprise request messages, a pair of a request message and a related response message, or a request message and one or more associated response messages. One of the defined RANAP functions is the transparent transfer of NAS information between the user equipment 170 and the core network 150. Herein transparency refers to the property of a digital transmission channel, a telecommunication circuit or a connection that permits any digital signal to be conveyed over it without changing the value or order of any of the signal elements. This function includes two sub-classes:

1. Transport of an initial NAS signaling message from the user equipment 170 to the core network 150. This function transparently transfers the NAS information. Consequently an Iu signaling connection is also set up.
2. Transport of NAS signaling messages between the user equipment 170 and the core network 150. This function transparently transfers the NAS signaling messages on the existing Iu signaling connection.

Figure 4:
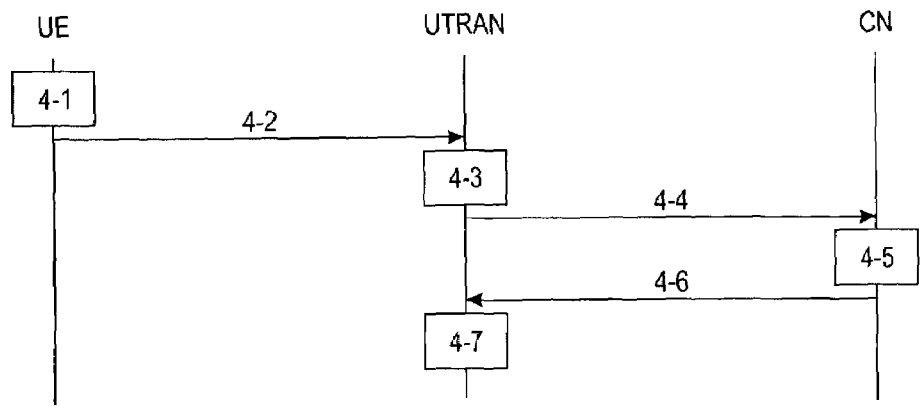
FIG. 4 shows a first preferred embodiment according to the invention.

Utilizing the concepts as described above in FIG. 3, FIG. 4 shows a first preferred embodiment concerning the information transfer for delivering information on the user equipment 170 version from the user equipment to the core network according to the invention. In this embodiment the information on the user equipment 170 version is included in an NAS message carried in the Initial Direct Transfer procedure. It should be noted that the Direct Transfer- procedure of RRC- and RANAP-protocols are elements of the embodiment described herein. Other communication systems may offer different protocols and mechanisms for delivering non-access stratum messages. The RRC: Uplink Direct transfer message that is used in the uplink direction to carry all subsequent upper layer NAS-messages of the signaling connection in the uplink is correspondingly applicable as well. FIG. 4 starts from a situation where the RRC of the user equipment 170 has received a request from the upper layers to set up a signaling connection to the core network 150 including a request for transfer of an NAS message. The user equipment 170 in idle mode will first establish an RRC connection; otherwise it will start by performing a cell update procedure. An initial direct transfer message substantially comprises a number of information elements (IE), and in step 4-1 the user equipment 170 forms a direct transfer message RRC. Initial Direct Transfer by defining and setting values for the required information elements.

In the embodied solution the user equipment 170 is configured to integrate the information concerning the user equipment version into the NAS message that is forwarded to the RRC for Direct Transfer procedure, either in an Initial Direct Transfer or Uplink Direct Transfer-message, and thereby deliver this information to the core network 150 without essentially increasing the signaling load between the user equipment 170 and the core network 150. Thus, the user equipment 170 sets the value of information element 'NAS message' as received from upper layers, and transmits the RRC: Initial Direct Transfer (step 4-2) over the Uu interface.

The information elements of the Initial Direct Transfer-message also comprise a definition on a targeted core network 150 domain. It should be noted that the Initial Direct Transfer-message or Uplink Direct Transfer-message are examples of potential carriers of the NAS-message comprising the user equipment version. Any other message capable of delivering the NAS-message that comprises the user equipment version from the user equipment 170 to the core network 150 essentially in time before the information is needed in communication between the network and the user equipment 170 is also applicable. Examples of potential NAS-messages to carry the user equipment version comprise Attach Request that is sent by the user equipment 170 to the network in order to perform a GPRS or a combined GPRS attach, or Location Updating request sent by the user equipment for initiating a location updating procedure or IMSI attach.

Whenever a transfer of user data is requested in the Iu, Iu UP protocol instances are established, relocated and released together with the associated radio access bearer. Whether these peer protocol instances will perform any radio access bearer related function depends on the mode of operation of the Iu UP. In the case of Direct Transfer-messages the transparent mode is appropriate since no particular feature is required from the Iu UP protocol other than transfer of the user data. The purpose of the Initial user equipment 170 Message procedure in RANAP 321 is to establish an Iu signaling connection between the core network 150 and the UMTS terrestrial radio access network 100 and to transfer the initial NAS-message to the addressed core network 150 node. Thus on reception of the RRC: Initial Direct Transfer-message the UMTS terrestrial radio access network 100 (step 4-3) forms a packet data unit (PDU) of a variable length of n octets that comprises the received NAS-message with other necessary information elements of the RANAP. This formed RANAP: Initial UE-message (step 4-4) is routed to the targeted core network 150 domain.

Upon receiving the PDU the receiving core network 150 network element will disperse the information elements and forward the NAS message to the upper layers, wherein the information on the applicable user equipment version will be available in the core network 150 node (step 4-5). In the next appropriate signaling instance, for example when the user equipment attaches to the MSC/VLR, the user equipment 170 performs normal location update to MSC/VLR, or attaches to the SGSN (not shown), information on the specific behavior associated with the user equipment is delivered to the UMTS terrestrial radio access network 100 (step 4-6). The 3GPP working groups have carefully considered whether the means for transferring the information on the functionality level of the user equipment 170 to the UMTS terrestrial radio access network 100 should comprise the full IMEISV distribution or an Iu interface bitmap derived from IMEISV, and the decision is still pending. However, the means for delivering the information from the core network 150 to the UMTS terrestrial radio access network 100 as such is not essential for the present invention, and even some other solution may be adapted.

For compatibility reasons the old core network 150 network elements that are not equipped with the invented functionality will automatically ignore the IMEISV that they receive as an additional element of the NAS-message. The new core network elements equipped with the invented functionality will monitor the received NAS-messages and when possible, extract the included user equipment version for further use. Correspondingly, the user equipment functionality for sending the user equipment specific behavior information is preferably implemented configurable, for example as a parameterized feature of the user equipment so that when the appropriate interoperability between the network and the user equipment is reached, sending of the user equipment specific behavior information can be terminated.

The described arrangement optimizes the delivery of information on the user equipment version from the user equipment 170 to the core network 150 at a very early stage of the communication between the user equipment 170 and the core network 150, and correspondingly allows an early delivery of the user specific behavior information from the core network 150 to the UMTS terrestrial radio access network 100. This facilitates avoiding the imminent problems due to the invalid information on the user equipment functionality levels in the UMTS terrestrial radio access network.

Figure 5:
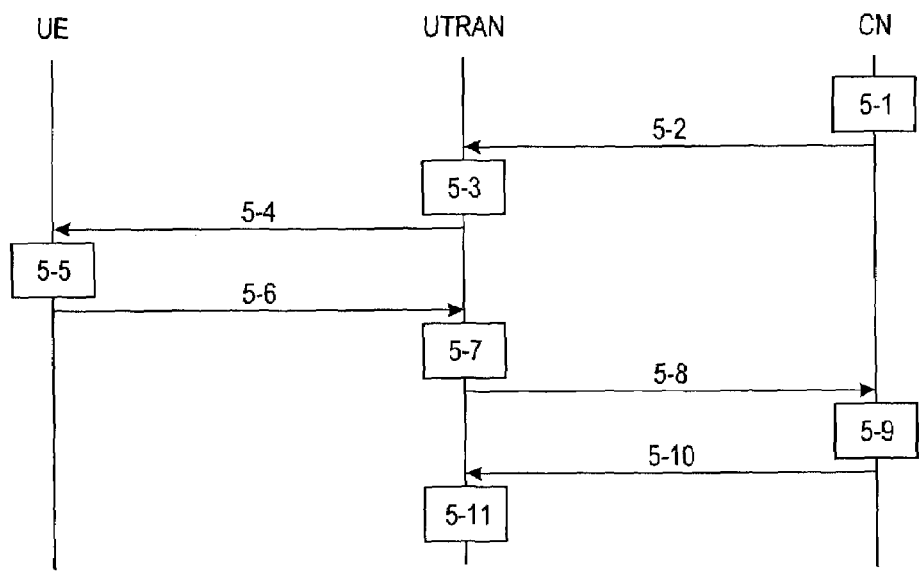
FIG. 5 illustrates another preferred embodiment of the invention.

FIG. 5 illustrates another preferred embodiment of the information transfer according to the invention for delivering the information on the user equipment version from the user equipment to the core network. In this embodiment the information on the user equipment version is transferred in connection with the information on the identity of the mobile subscriber or the mobile equipment in a NAS-message that is sent as a response to an identity request from the core network 150. FIG. 5 starts from a situation where a core network 150 mobility management function (upper layer function) initiates an identification procedure. The identification procedure can be used to request a mobile station to provide specific identification parameters to the network, such as an International Mobile Subscriber Identity (IMSI) and an International Mobile Equipment Identity (IMEI). The core network 150 initiates the identification procedure (step 5-1) by sending an RANAP. Direct Transfer-message (step 5-2) that comprises a NAS Identity Request-message addressed to the user equipment 170. The NAS Identity Request-message specifies the requested identification parameters in the Identity Type-information element, the values for the element comprising IMSI, IMEI, IMEISV, TMSI. Typically only one information type can be indicated thereby. In the UMTS terrestrial radio access network 100, transparent mode is applied (step 5-3) and an RRC: Downlink Direct Transfer-message comprising the NAS Identity Request-message is transferred to the user equipment 170 (step 5-4). According to the invention, the user equipment 170 will form (step 5-5) the response to the received identity request in such a way that the information on the user equipment version is included in the message together with any of the other values IMSI, IMEI or TMSI. For example, if the value of the Identity Type-information element in the received identity request is IMSI, the response will comprise both the IMSI and the IMEISV, and for IMEI and TMSI correspondingly. However, if the value of the Identity Type-information element in the received identity request is IMEISV, the response can be configured to comprise any of the IMSI, IMEI or TMSI together with the IMEISV. The user equipment 170 will include the formed NAS Identity Response-message into an RRC. Uplink Direct Transfer-message and transfer that to the UMTS terrestrial radio access network 100 (step 5-6). From the received RRC: Uplink Direct Transfer-message the UMTS terrestrial radio access network 100 will, in a transparent mode, form (step 5-7) a RANAP: Direct Transfer—message for delivery (step 5-8) to the core network 150. Upon receiving the message that comprises a NAS Identity Response-message the core network 150 will disperse the information elements and forward the NAS message to the upper MM-layer (step 5-9), wherein the information on the user equipment version will be available for delivery to the RAN (step 5-10).

Figure 6:
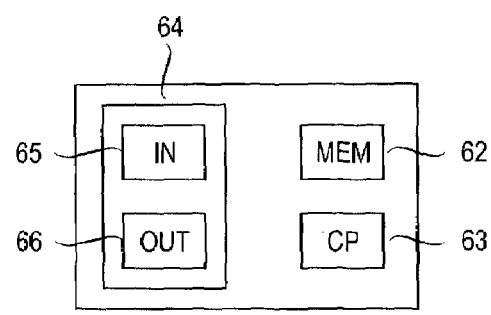
FIG. 6 schematically illustrates the basic functional structure of a network element of the mobile communications system.

FIG. 6 schematically illustrates the basic functional structure of a network element of the mobile communications system in FIG. 1, such as user equipment, radio network controller, Node B, HLR, MSC/VLR, SGSN, GGSN, or the possible servers integrated therein. The unit comprises processing means 63, an element that comprises an arithmetic logic unit, a number of special registers and control circuits. Connected to the processing means are memory means 62, a data medium where computer-readable data or programs, or user data can be stored. The memory means typically comprise memory units that allow both reading and writing (RAM), and a memory whose contents can only be read (ROM). The unit also comprises an interface block 64 with input means 65 for inputting data for internal processing in the unit, and output means 66 for outputting data from the internal processes of the unit. Examples of said input means comprise a plug-in unit acting as a gateway for the information delivered to its external connection points, a keypad, or a touch screen, a microphone, or equal. Examples of said output means comprise a plug-in unit feeding information to the lines connected to its external connection points, a screen, a touch screen, a loudspeaker, or equal. The processing means 63, memory means 62, and interface block 64 are electrically interconnected for performing systematic execution of operations on the received and/or stored data according to the predefined, essentially programmed processes of the unit. In a solution according to the invention the operations comprise the functionality as described above.

It will be obvious to a person skilled in the art that, as technology advances, the inventive concept can be implemented in various ways. The invention and its embodiments are not limited to the examples described above but may vary within the scope of the claims.

The invention claimed is:

1. A network comprising:
   a plurality of user equipment;
   a radio access network;
   a core network comprising a plurality of core network elements; and
   a plurality of user equipment groups, a user equipment version presenting a radio access network functionality set of the user equipment in the group,
   wherein at least one user equipment is configured to spontaneously integrate an identifier that indicates its user equipment version within a defined non-access stratum signaling message transparently transmitted over the radio access network from the at least one user equipment to the at least one core network element, and
   at least one of the core network elements is configured to receive the transparently transmitted non-access stratum signaling message and to extract the identifier that indicates a user equipment version from said non-access stratum signaling message, and
   the at least one of the core network element is configured to map the received identifier to at least one user equipment specific behavior information element, and to send the at least one user equipment specific behavior information to a radio access network element.

2. A network according to claim 1, wherein the radio access network element is configured to adjust the communication with the at least one user equipment according to the received at least one user equipment specific behavior information element.

3. A network according to claim 1, wherein the defined non-access stratum signaling message is delivered using a direct transfer procedure.

4. A network according to claim 1, wherein the non-access stratum signaling message carrying the identifier that indicates the user equipment version is integrated to one of the following signaling messages: uplink attach request, or uplink location updating request.

5. A network according to claim 1, wherein the identifier that indicates the user equipment version is integrated together with at least one other identity information element, and the defined signaling message to which the non-access stratum signaling message carrying the identifier is spontaneously integrated is a response to an identity request by a mobile communications network.

6. A method, comprising:
   defining at least one user equipment version presenting a user equipment radio access network functionality set for a group of user equipment;
   integrating spontaneously in a user equipment an identifier that indicates a user equipment version of the user equipment within a defined non-access stratum signaling message from a user equipment to at least one core network element transparently transmitted over the radio access network;
   extracting in the at least one core network element from the transparently transmitted non-access stratum signaling message the identifier that indicates the user equipment version; and
   mapping of the received identifier to the at least one user equipment specific behavior information element, and sending the at least one user equipment specific behavior information from the core network element to a radio access network element.

7. A method according to claim 6, further comprising: adjusting an operation of the radio access network element according to the received at least one user equipment specific behavior information.

8. A method according to claim 6, further comprising: delivering the defined non-access stratum signaling message using a direct transfer procedure.

9. A method according to claim 6, further comprising: integrating the non-access stratum signaling message carrying the identifier that indicates the user equipment version to one of the following signaling messages: uplink attach request, or uplink location updating request.

10. A method according to claim 6, further comprising: integrating the identifier that indicates the user equipment version together with at least one other identity information element, and the defined signaling message to which the non-access stratum signaling message carrying the identifier is spontaneously integrated is a response to an identity request by the network.

11. An apparatus, comprising
    at least one user equipment version corresponding to a radio access network functionality set for a group of user equipment,
    wherein the apparatus is configured to spontaneously integrate an identifier that indicates its user equipment version within a defined non-access stratum signaling message for transparent transmission over the radio access network from the at least one user equipment to at least one core network element.

12. An apparatus according to claim 11, wherein the user equipment is configured to deliver the defined non-access stratum signaling message using a direct transfer procedure.

13. An apparatus according to claim 11, wherein the user equipment is configured to integrate the non-access stratum signaling message carrying the identifier that indicates the user equipment version into one of the following signaling messages: uplink attach request, or uplink location updating request.

14. An apparatus according to claim 11, wherein the user equipment is configured to integrate the identifier that indicates the user equipment version together with at least one other identity information element, and integrate the identifier in a response to an identity request by a mobile communications network.

15. An apparatus, comprising
at least one user equipment version corresponding to a radio access network functionality set for a group of user equipment,
wherein the apparatus is an element of the core network and configured to receive an identifier that indicates a user equipment version within a defined transparently over the radio access network transmitted non-access stratum signaling message, the identifier being spontaneously integrated to the non-access stratum signaling message by at least one user equipment, the user equipment version presenting a radio access network functionality set for a group of user equipment, and
the core network element is configured to extract from the transparently transmitted non-access stratum signaling message the identifier that indicates the user equipment version from said non-access stratum signaling message; and
the apparatus is configured to map the received identifier to at least one user equipment specific behavior information element, and to send the at least one user equipment specific behavior information to a radio access network element.

16. An apparatus according to claim 15, wherein the apparatus is configured to receive the defined non-access stratum signaling message using a direct transfer procedure.

17. An apparatus according to claim 15, wherein the apparatus is configured to receive the identifier that indicates the user equipment version integrated together with at least one other identity information element within a response to an identity request.

18. A mobile communications network, comprising:
user equipment means;
a radio access network;
a core network comprising plurality of core network means; and
user equipment group means, a user equipment version presenting a radio access network functionality set of the user equipment in the group,
wherein
at least one user equipment means is provided for spontaneously integrating an identifier that indicates its user equipment version within a defined non-access stratum signaling message transparently transmitted over the radio access network from the at least one user equipment to the at least one core network means, and
at least one core network means is provided for receiving the transparently transmitted non-access stratum signaling message and for extracting the identifier that indicates a user equipment version from said non-access stratum signaling message; and
the at least one core network means is provided for mapping the received identifier to at least one user equipment specific behavior information element, and for sending the at least one user equipment specific behavior information to a radio access network element.

19. A method, comprising:
defining at least one user equipment version corresponding to a radio access network functionality set for a group of user equipment,
wherein the apparatus is configured to spontaneously integrate an identifier that indicates its user equipment version within a defined non-access stratum signaling message for transparent transmission over the radio access network from the at least one user equipment to at least one core network element.

20. A method, comprising:
defining at least one user equipment version corresponding to a radio access network functionality set for a group of user equipment,
wherein the apparatus is an element of the core network and configured to receive an identifier that indicates a user equipment version within a defined transparently over the radio access network transmitted non-access stratum signaling message, the identifier being spontaneously integrated to the non-access stratum signaling message by at least one user equipment, the user equipment version presenting a radio access network functionality set for a group of user equipment, and
the core network element is configured to extract from the transparently transmitted non-access stratum signaling message the identifier that indicates the user equipment version from said non-access stratum signaling message; and
the apparatus is configured to map the received identifier to at least one user equipment specific behavior information element, and to send the at least one user equipment specific behavior information to a radio access network element.

* * * * *